US012188625B1

(12) United States Patent
Loomis et al.

(10) Patent No.: US 12,188,625 B1
(45) Date of Patent: Jan. 7, 2025

(54) LIGHTING ELEMENTS WITH WHITE-COLOR INDICATOR

(71) Applicant: Eastern Lite International Limited, Kowloon (HK)

(72) Inventors: Jason A. Loomis, Decatur, GA (US); Yixin Long, Jiangmen (CN); Nash Rittmann, Odessa, FL (US)

(73) Assignee: Eastern Lite International Limited, Kowloon (HK)

( * ) Notice: Subject to any disclaimer, the term of this patent is extended or adjusted under 35 U.S.C. 154(b) by 0 days.

(21) Appl. No.: 18/405,233

(22) Filed: Jan. 5, 2024

(51) Int. Cl.

| | |
|---|---|
| ***F21S 4/10*** | (2016.01) |
| ***H01R 13/46*** | (2006.01) |
| ***H01R 33/22*** | (2006.01) |
| *F21W 121/04* | (2006.01) |
| *F21Y 115/10* | (2016.01) |

(52) U.S. Cl.
CPC .............. *F21S 4/10* (2016.01); *H01R 13/465* (2013.01); *H01R 33/225* (2013.01); *F21W 2121/04* (2013.01); *F21Y 2115/10* (2016.08)

(58) Field of Classification Search
CPC .............. F21S 4/10; F21S 4/15; H01R 13/465
See application file for complete search history.

(56) References Cited

U.S. PATENT DOCUMENTS

| | | | | |
|---|---|---|---|---|
| 5,662,472 | A | 9/1997 | Grutzner | |
| 2005/0270797 | A1 | 12/2005 | Lin | |
| 2015/0084515 | A1* | 3/2015 | Altamura .............. | H05B 45/20 315/131 |
| 2016/0091154 | A1 | 3/2016 | Janning | |

* cited by examiner

*Primary Examiner* — Sean P Gramling
(74) *Attorney, Agent, or Firm* — Kinney & Lange, P.A.

(57) ABSTRACT

Apparatus and associated methods relate to providing clear indication of a color of a white-color light of a lighting element. To do so, a white-color indicator is affixed to the lighting element, which has a base, an illumination element, and a lens extending from the base and with the base surrounds the illumination element. The base of the lighting element is configured to physically and electrically connect with a socket of a lighting display. The illumination element is configured to provide white-color light in response to the base receiving electrical power from the socket. The lens is configured to transmit the white-color light of the illumination element therethrough. The white-color indicator is of a color that indicates the color of the white-color light of the illumination element, thereby providing clear indication of the color of the white-color light of the lighting element.

18 Claims, 2 Drawing Sheets

LIGHTING ELEMENTS WITH WHITE-COLOR INDICATOR

BACKGROUND

Lighting displays are used to communicate the joy of a holiday season, to draw attention to merchandise, or to simply decorate or adorn an object or structure. Lighting displays can be used both indoors and outdoors. Lighting displays have been used residentially to adorn trees, shrubs, and houses. Commercial businesses have used lighting displays to provide festive atmospheres at their places of business. Even vehicles can be equipped with decorative lighting elements.

Many such lighting displays use a great many lighting elements. Some lighting displays employ lighting elements of a single color, while others use two or more colors. The human eye can discern small differences in colors, even a single lighting element that is slightly miscolored from matching other very similarly colored lighting elements. These lighting displays traditionally have been constructed using incandescent bulbs, with colors being determined by coloration of lenses covering the incandescent bulbs. The white-color of incandescent bulbs is not pure white, but rather, slightly yellowish.

In more recent times, Light Emitting Diodes (LED) are being used in many, if not most, lighting displays. Coloration using LED's can be determined by coloration of lenses covering white-color LEDs, as was traditionally done. Coloration can also be determined by using LEDs that emit colored light as well. Some LEDs have multiple elements, each of a different color. The combination of the intensity of light emitted by each of the elements determines the color perceived. There are various different hues of white-color light that can be emitted by such LEDs. Some such LEDs emit a white color intended to appear like an incandescent bulb. Other LEDs emit a white color intended to appear light a fluorescent bulb (e.g., with more of a blue tint). Still other LEDs are intended to mimic sunlight.

When constructing a multi-element lighting display or replacing lighting elements of a multi-element lighting display, it can be difficult to select the properly colored lighting element from among a suite of two or more similarly colored lighting elements. White-color lighting elements are particularly difficult to distinguish as such lighting elements typically have uncolored transparent lenses, thereby making such white-color lighting elements virtually indistinguishable.

SUMMARY

Some embodiments relate to a lighting element with white-color indicator. The lighting element includes a base configured to mechanically and electrically connect with a socket. The lighting element includes an illumination element configured to provide white-color light in response to the base receiving electrical power from the socket. The lighting element includes a lens extending from the base and with the base surrounds the illumination element. The lens is configured to transmit the white-color light of the illumination element therethrough. The lighting element also includes a white-color indicator of a color that indicates the color of the white-color light of the illumination element.

Some embodiments relate to a method of indicating a color of a white-color light of a lighting element. The method includes providing a lighting element having a base, an illumination element, and a lens extending from the base and surrounding the illumination element. The base is configured to mechanically and electrically connect with a socket. The illumination element is configured to provide white-color light in response to the base receiving electrical power from the socket. The lens is configured to provide transmission of the white-color light of the illumination element therethrough. The method also includes circumscribing the lighting element with a white-color indicator of a color that indicates the color of the white-color light of the illumination element.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Apparatus and associated methods relate to providing clear indication of a color of a white-color light of a lighting element. To do so, a white-color indicator is affixed to the lighting element, which has a base, an illumination element, and a lens extending from the base and with the base surrounds the illumination element. The base of the lighting element is configured to physically and electrically connect with a socket of a lighting display. The illumination element is configured to provide white-color light in response to the base receiving electrical power from the socket. The lens is configured to transmit the white-color light of the illumination element therethrough. The white-color indicator is of a color that indicates the color of the white-color light of the illumination element, thereby providing clear indication of the color of the white-color light of the lighting element.

Figure 1:
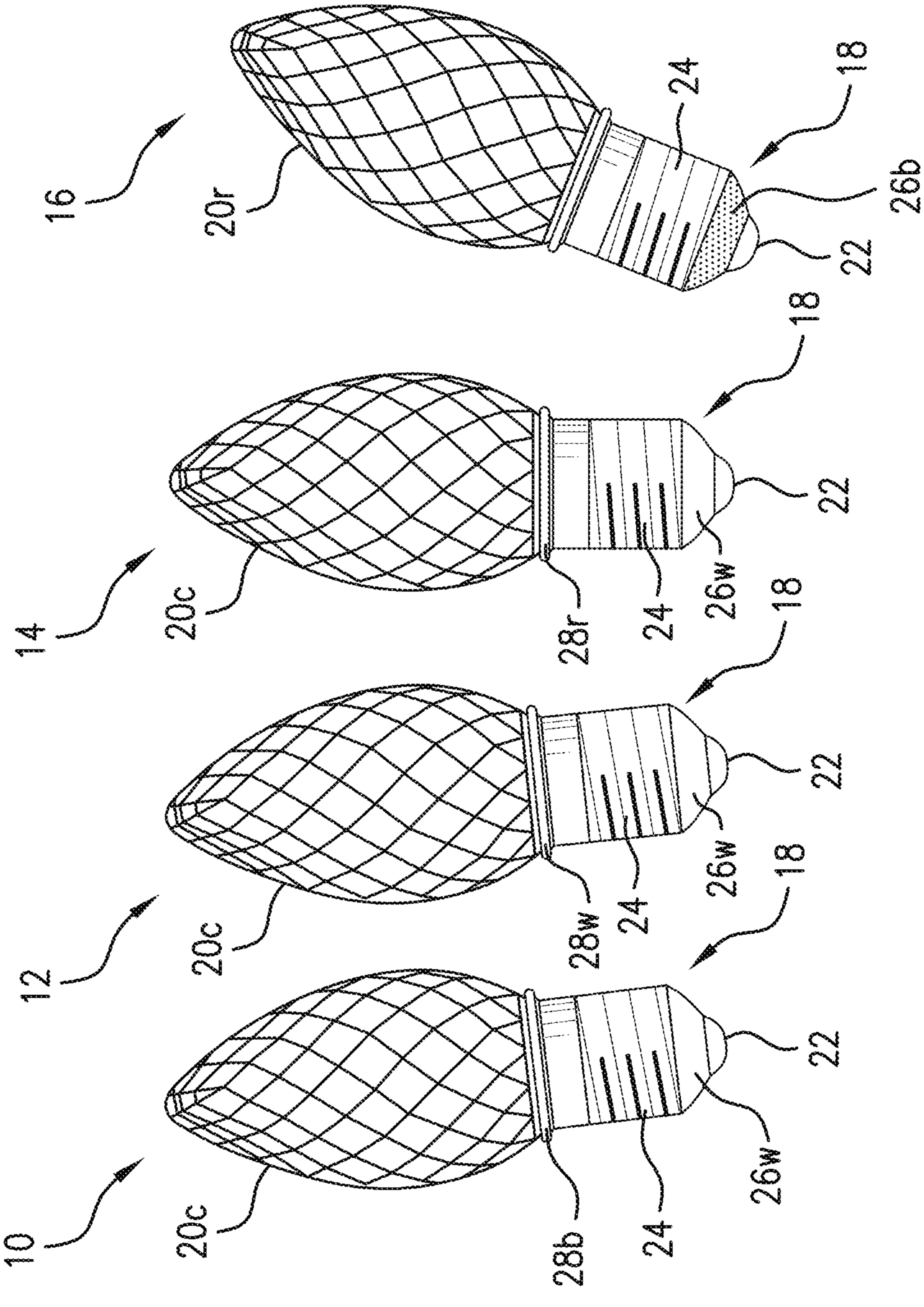
FIG. 1 is a perspective view of lighting elements that have white-color indicators.

FIG. 1 is a perspective view of lighting elements that have white-color indicators. In FIG. 1, lighting elements 10, 12, 14 and 16 are configured to provide four different colors of light. Each of lighting elements 10, 12, 14 and 16 includes base 18 and lens 20*c* or 20*r*. Base 18 of each of lighting elements 10, 12, 14 and 16 are configured to mechanically and electrically connect with a socket. In the depicted embodiment, base 18 of each of lighting elements 10, 12, 14 and 16 has threads about a substantially cylindrical body for providing mechanical connection with a complementary threaded socket. Base 18 of each of lighting elements 10, 12, 14 and 16 also has first and second electrical terminals 22 and 24. First electrical terminal 22 is located at and centered within an end of base 18, which is surrounded by insulator 26*w* or 26*b*. Second electrical terminal 24 circumscribes the substantially cylindrical body of base 18. Electrical insulators 26*w* and 26*b* provide isolation between first and second electrical terminals 22 and 24. Electrical insulators 26*w* and 26*b* are colored so as to indicate the power configuration, for which lighting elements 10, 12, 14 and 16 are configured to receive. For example, insulators 26*w* of lighting elements 10, 12 and 14 are colored white, indicating that lighting elements 10, 12 and 14 are configured to receive 24 Volt DC operating power. Electrical insulator 26*b* of lighting element 16 is colored black, indicating that lighting element 16 is configured to receive 120 Volt AC operating power. Other operating power configurations can be indicated using other colors of insulators. Such easily colors of electrical insulators 26*w* and 26*b* can greatly facilitate identification of operating power configurations for sets of lighting elements, such as lighting elements 10, 12, 14 and 16, having different operating power requirements. Such easy power-configuration identification can greatly expedite assembly of complex lighting displays.

Lighting elements 10, 12 and 14 include white-color indicators 28*b*, 28*w*, and 28*r*, respectively, which are differently colored from one another so as to indicate the color of the white-color light of the illumination elements (e.g., the LEDs) within lenses 20*c* of lighting elements 10, 12 and 14, respectively. Although white-color indicators 28*b*, 28*w*, and 28*r* can be arbitrarily colored, in some embodiments, the colors of the white-color indicators 28*b*, 28*w*, and 28*r* correspond, in some manner, to the colors of the white-color light emitted by the illumination elements within lenses 20*c*. For example, warm colors (i.e., reds, oranges, and yellows) can be used to indicate a warm color of the white-color light and cool colors (i.e., violets, blues and greens) can be used to indicate a cool color of the white-color light. More gradations of color can be used when more colors of white-color lighting devices are used.

In the FIG. 1 depiction, lighting element 10 has white-color indicator 28*b*, which is colored light blue, indicating that the white-color of light emitted by illumination element within lens 20*c* of lighting element 10 has a bluish hue—a cool white-color. Lighting element 12 has white-color indicator 28*w*, which is colored white, indicating that the white-color of light emitted by the illumination element within lens 20*c* of lighting element 10 is pure white. Lighting element 14 has white-color indicator 28*r*, which is colored red, indicating that the white-color of light emitted by the illumination element within lens 20*c* of lighting element 10 has a reddish hue or some other warm white-color. In the depicted embodiment each of white-color indicators 28*b*, 28*w*, and 28*r* is an elastic band that circumscribes lighting elements 10, 12 and 14, respectively, proximate an interface between the lens 22*c* and the base 18. Such easily viewed white-color indicators 28*b*, 28*w* and 28*r* can greatly facilitate proper white-color selection from sets of white-color lighting elements, such as lighting elements 10, 12 and 14. Such easy white-color identification can greatly expedite assembly of complex lighting displays.

Lens 22*c* is clear or transparent for each of lighting elements 10, 12, and 14, thereby transmitting the white-color light emitted by the illumination elements and through lenses 20*c* without change in color. Lens 22*r* is red for lighting element 16, which provides red coloration of light emitted by the illumination element of lighting element 16. Such coloration is caused by the red lens permitting only transmission of red light and blocking other colors of light. Such a red colored lens results in red colored illumination, even when the illumination element emits white-color light. Because the red color of lens 22*r* is indicative of the color of light that lighting element 16 produces, no additional color indicator is necessary for indicating the color of light produced by lighting element 16. As will be described below, however, an elastic band may still be used for other purposes.

Not only can a colored elastic band indicate hue of white-color light that will be emitted by an illumination element, but such an elastic band can also perform other useful operations. For example, an elastic band can be configured to inhibit water ingress into an electrical socket when the lighting element is physically and electrically connected thereto. For example, the elastic band can be configured to contact a mating surface of both the lighting element and the socket in a continuous or uninterrupted fashion when the lighting element is physically and electrically connected thereto, thereby forming a sealed interface therebetween. Such a seal can prevent degradation of operation of a lighting display due to the elements for outdoor applications. In other embodiments, an elastic band can be helpful in retaining a lighting element in a socket. Such retention can inhibit unwanted loosening of connections between a lighting element and a socket, due to vibration, wind, thermal cycling, etc.

Although FIG. 1 depicts embodiments of lighting elements 10, 12, 14 and 16 having a screw-in type connector and a specific lens design, other embodiments of lighting elements can employ white-color indicators that indicate color that indicates the color of the white-color light of the illumination element. Some embodiments, for example, have connectors that have plug-in or plug-in-and-turn-to-secure type of connectors. Regardless of the type of lighting element, a white-color indicator that indicates the color of white-color light to be emitted can greatly facilitate assembly and/or repair of a lighting display, such as, for example, a light string. Moreover, a white-color indicator that circumscribes a lighting element can be readily viewed regardless of orientation of the lighting element.

In some embodiments, the color of white-color indicators 28*b*, 28*w*, and 28*r* can be of substantially the same hue as that of the white-color light emitted by lighting elements 10, 12 and 14. For example, the color of each of white-color indicators 28*b*, 28*w*, and 28*r* enhance the colors of the white-color light, so as to be more readily perceived by the human eye. To better understand the theory behind such enhancing of the colors of white-color emissions, a brief expository of color models follows. A retina of the human eye has two different kinds of light sensitive cells: i) cone cells and ii) rod cells. Cone cells can be divided into three kinds, each having a different spectral sensitivity. A first kind of cone cell has a peak response to relatively long wavelengths of visible light and is designated an L type cone ('L' for long wavelength). A second kind of cone cell has a peak response to relatively short wavelengths of visible light and is designated an S type cone ('S' for short wavelength). And a third kind of cone cell has a peak response to medium wavelengths of visible light and is designated an M type cone ('M' for medium wavelength). The rod cells have a relatively monochromatic response and are important in low light conditions, but assist little, if at all, in the detection of color.

All three kinds of cone cells will generate a signal in response to an incident light signal. Both intensity and hue can be determined from the three independent signals generated by the three different kinds of cone cells. These three independent response signals can provide a human brain the necessary information to determine both a color and an intensity of a light signal incident upon the human eye. Different mathematical color models can mimic the responses of the three different kinds of cone cells. Such a color model can use three independent variables to map a light signal into both a color metric and an intensity metric. Some color models divide these three independent variables into one variable that represents the intensity metric, and two variables that represent the color metric. In some models, these independent variables can be assigned values similar to or as linear combinations of the independent response signals generated by cone cells of a human eye.

Some color models can separate the three independent degrees of freedom associated with the three independent variables into two separate classes: i) one degree of freedom (e.g., corresponding to one of the variables) for indicating luminance (e.g., brightness); and ii) two degrees of freedom (e.g., corresponding to two of the independent variables) for indicating chromaticity (e.g., color or hue). One way of doing this is to first determine the overall magnitude of the three cone response signals (or the LMS signals). This overall magnitude can be used as indicative of the luminance. Second, one can normalize the cone response signals (e.g., by dividing each cone response signal by the determined magnitude). The three normalized cone response signals can, for example, be normalized such that their sum is equal to unity. Then, one can select any two of the normalized response signals as indicative of the color (the third normalized response being dependent upon the other two—e.g., z=1-x-y). Thus, these two selected normalized cone response signals can be uses as two independent degrees of freedom that span a chromaticity (or hue) space of a color model.

One such model of color that is sometimes used is called the 1931-CIE xy-chromaticity model. This model uses three basis functions that are similar to the three response functions of the different types of cone cells. Each of the response functions generates a signal indicative of its particular response to a light signal. The variables X, Y, and Z are used to represent the three different response signals, which generally correspond to the L, M, and S cone response signals, respectively. Each of the generated signals is then normalized by dividing each of the generated signals by the sum of the three generated signals. The normalized response signals are represented by the lower case variables, x, y, and z. The x and y normalized response signals are then selected and used to indicate the chromaticity of the lighting signal.

Figure 2:
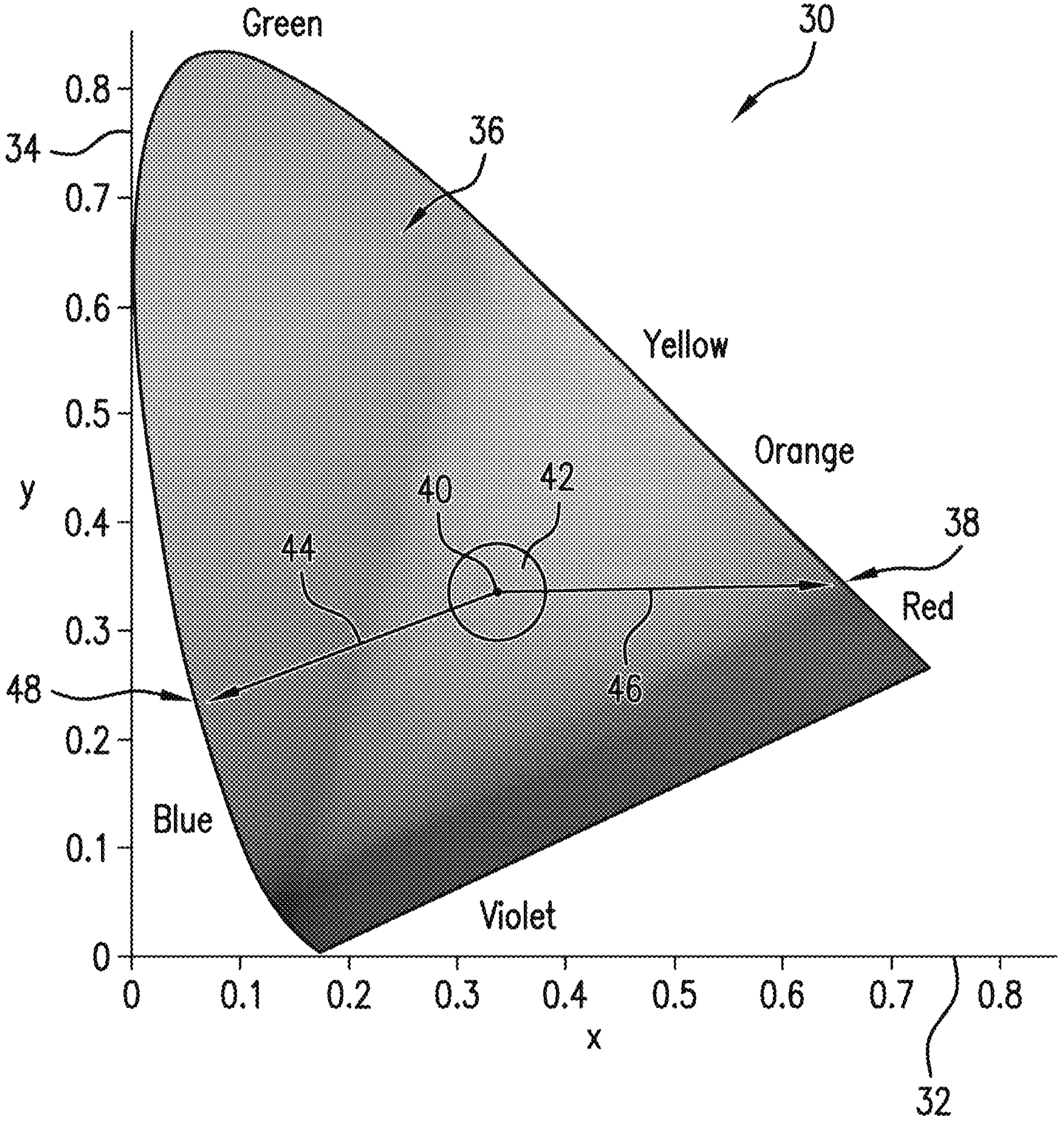
FIG. 2 is an xy-chromaticity diagram, which can be used to show a method of white-color indication.

One such exemplary color model will now be used to describe how a color can be controlled using only a single light-emitting device. FIG. 2 is an xy-chromaticity diagram, which can be used to show a method of white-color indication. In FIG. 2, xy-chromaticity diagram 30 has horizontal axis 32 that represents a first independent color-response signal. The first independent color-response signal, in this depiction, can be related to a long wavelength response signal, such as, for example, a response of an L-type cone cell. Thus, as one travels toward increasing x-axis values, colors that appear red to a human observer will be encountered. Xy-chromaticity diagram 30 has vertical axis 34 that represents a second independent color-response signal. The second independent color-response signal, in this depiction, can be related to a medium wavelength response signal, such as, for example, a response of an M-type cone cell. Thus, as one travels toward increasing y-axis values, colors that appear more green to a human observer will be encountered.

Xy-chromaticity diagram 30 has color specification region 36 within a gamut of human-perceivable colors. Color-specification region 36 is represented by a closed figure circumscribed by color-specification boundary 38. An area enclosed by color-specification boundary 38 can represent all colors that meet specific color criteria. Pure-white color specification 40 is located near the center of color-specification region 36. About pure-white color specification is a zone of white-color light region 42, which a human eyes perceive as nearly pure white-color light. The various hues are represented by vectors extending from pure-white color specification 40 to color-specification boundary 38. As one travels along any of such vectors, the hue is unchanged, but the hue becomes darker as one goes from pure-white color specification 40 to color-specification boundary 38. Some such hues are annotated about the color-specification boundary 38.

Xy-chromaticity diagram 30 depicts two such hue vectors—light-blue hue vector 44 and red hue vector 46, each of which extend from pure-white color specification 40, which has an ($x_{PURE\text{-}WHITE}$, $y_{IPURE\text{-}WHITE}$) chromaticity of pure white, to color-specification boundary 38. At intersection point 48 of light-blue hue vector 44 the color-specification boundary 38 the hue of white-color light within white-color light region 42 along light-blue hue vector 44 is most amplified. This is because the human eyes are better able to perceive and distinguish color near color-specification boundary 38 than it is near pure-white color specification 40.

White-color indicator **28*b* (depicted in FIG. 1) can have a color having an ($x_{INDICATOR}$, $y_{INDICATOR}$) chromaticity on xy-chromaticity diagram 30. Such a white-color indicator 28*b* will enhance color of light having a color having an ($x_{WHITE\text{-}COLOR}$, $y_{WHITE\text{-}COLOR}$) chromaticity, which is within white-color light region 42** on the xy-chromaticity diagram. The light-blue color vector can be mathematically given by:

$$y_{INDICATOR} = m(x_{INDICATOR} - x_{PURE\text{-}WHITE}) + y_{PURE\text{-}WHITE},$$
$$\text{where } m = \frac{y_{WHITE\text{-}COLOR} - y_{PURE\text{-}WHITE}}{x_{WHITE\text{-}COLOR} - x_{PURE\text{-}WHITE}}$$

The red hue vector is also shown extending from pure-white color specification 40, which has an ($x_{PURE\text{-}WHITE}$, $y_{IPURE\text{-}WHITE}$) chromaticity of pure white, to color-specification boundary 38.

It will be recognized that the invention is not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

The invention claimed is:

1. A lighting element with white-color indicator, the lighting element comprising:

a base configured to mechanically and electrically connect with a socket:

an illumination element configured to provide white-color light of a chromaticity of white color in response to the base receiving electrical power from the socket;

a lens extending from the base, the lens together with the base surrounding the illumination element, the lens configured to transmit the white-color light of the illumination element therethrough; and a white-color indicator comprising an elastic band circumscribing either the base or the transparent lens, the elastic band of a color that indicates the chromaticity of the white-color light of the illumination element.

2. The lighting element of claim 1, wherein the white-color indicator is a warm color so as to indicate a warm color of the white-color light.

3. The lighting element of claim 1, wherein the white-color indicator is a cool color so as to indicate a cool color of the white-color light.

4. The lighting element of claim 1, wherein the white-color indicator is white so as to indicate a pure white color of the white-color light.

5. The lighting element of claim 1, wherein:

the white-color light of the illumination element has an $(x_{WHITE\text{-}COLOR}, y_{WHITE\text{-}COLOR})$ chromaticity on an xy-chromaticity diagram;

the white-color indicator has a color having an $(x_{INDICATOR}, y_{INDICATOR})$ chromaticity on the xy-chromaticity diagram; and the $(x_{WHITE\text{-}COLOR}, y_{WHITE\text{-}COLOR})$ chromaticity and the $(x_{INDICATOR}, y_{INDICATOR})$ chromaticity lie on a vector in the xy-chromaticity diagram that includes a $(x_{PURE\text{-}WHITE}, y_{IPURE\text{-}WHITE})$ chromaticity of pure white.

6. The lighting element of claim 5, wherein the $(x_{INDICATOR}, y_{INDICATOR})$ chromaticity of the color indicator lies on a point at a peripheral boundary of the xy-chromaticity diagram.

7. The lighting element of claim 6, wherein the $(x_{INDICATOR}, y_{INDICATOR})$ chromaticity of the is given by:

$$y_{INDICATOR} = m(x_{INDICATOR} - x_{PURE-WHITE}) + y_{PURE-WHITE},$$

$$\text{where } m = \frac{y_{WHITE-COLOR} - y_{PURE-WHITE}}{x_{WHITE-COLOR} - x_{PURE-WHITE}}$$

8. The lighting element of claim 1, wherein the white-color indicator is visible when the lighting element is physically and electrically connected to the socket.

9. The lighting element of claim 1, wherein the elastic band is located proximate an interface between the transparent lens and the base.

10. The lighting element of claim 1, wherein the elastic band contacts mating surface of the lighting element in an uninterrupted fashion around the lighting element, thereby forming a sealed interface therewith.

11. The lighting element of claim 10, wherein the elastic band is configured to contact a mating surface of the socket in an uninterrupted fashion when the lighting element is physically and electrically connected thereto, thereby forming a sealed interface therewith.

12. The lighting element of claim 11, wherein the elastic band is configured to inhibit water ingress into the socket when the lighting element is physically and electrically connected thereto.

13. The lighting element of claim 11, wherein the elastic band is configured to facilitate retention of the lighting element when the lighting element is physically and electrically connected to the socket.

14. The lighting element of claim 1, wherein the lens is transparent such that the color of the white-color light of the illumination element is unchanged by transmission therethrough.

15. A method of indicating a color of a white-color light of a lighting element, the method comprising:

providing a lighting element having a base, an illumination element, and a lens extending from the base, the lens together with the base surrounding the illumination element, the base configured to mechanically and electrically connect with a socket, the illumination element configured to provide white-color light of a chromaticity of white color in response to the base receiving electrical power from the socket, and the lens configured to provide transmission of the white-color light of the illumination element therethrough; and circumscribing the lighting element with a white-color indicator comprising an elastic band circumscribing either the base or the transparent lens, the elastic band of a color that indicates the chromaticity of white-color light of the illumination element.

16. The method of claim 15, wherein the white-color indicator is a warm color so as to indicate a warm color of the white-color light.

17. The method of claim 15, wherein the white-color indicator is a cool color so as to indicate a cool color of the white-color light.

18. The method of claim 15, wherein the white-color indicator is white so as to indicate a pure white color of the white-color light.

* * * * *